(12) United States Patent
Cui et al.

(10) Patent No.: US 10,882,192 B2
(45) Date of Patent: Jan. 5, 2021

(54) MANIPULATOR ARM, MANIPULATOR AND CARRYING DEVICE

(71) Applicants: BOE TECHNOLOGY GROUP CO., LTD., Beijing (CN); ORDOS YUANSHENG OPTOELECTRONICS CO., LTD., Inner Mongolia Autonomous Region (CN)

(72) Inventors: Fuyi Cui, Beijing (CN); Quanqin Sun, Beijing (CN); Xiangnan Wang, Beijing (CN); Ang Xiao, Beijing (CN); Hyunchel Shin, Beijing (CN)

(73) Assignees: BOE TECHNOLOGY GROUP CO., LTD., Beijing (CN); ORDOS YUANSHENG OPTOELECTRONICS CO., LTD., Inner Mongolia (CN)

( * ) Notice: Subject to any disclaimer, the term of this patent is extended or adjusted under 35 U.S.C. 154(b) by 0 days.

(21) Appl. No.: 15/544,696

(22) PCT Filed: Jan. 25, 2017

(86) PCT No.: PCT/CN2017/072533
§ 371 (c)(1),
(2) Date: Jul. 19, 2017

(87) PCT Pub. No.: WO2017/193643
PCT Pub. Date: Nov. 16, 2017

(65) Prior Publication Data
US 2019/0061173 A1    Feb. 28, 2019

(30) Foreign Application Priority Data
May 13, 2016 (CN) .................... 2016 2 0437984 U

(51) Int. Cl.
*B25J 15/06* (2006.01)
*B65G 47/91* (2006.01)

(52) U.S. Cl.
CPC .......... *B25J 15/0616* (2013.01); *B25J 15/06* (2013.01); *B65G 47/91* (2013.01)

(58) Field of Classification Search
CPC ............... B25J 15/0616; B25J 15/0683; B25J 15/0691; B25J 11/0095; B25J 15/0014;
(Continued)

(56) References Cited

U.S. PATENT DOCUMENTS

| 4,389,064 A * | 6/1983 | Laverriere | B66C 1/025 |
| | | | 209/905 |
| 5,149,162 A * | 9/1992 | Focke | B65G 47/91 |
| | | | 294/188 |

(Continued)

FOREIGN PATENT DOCUMENTS

| CN | 203185351 U | 9/2013 |
| CN | 103465267 A | 12/2013 |

(Continued)

OTHER PUBLICATIONS

International Search Report and Written Opinion for Application No. PCT/CN2017/072533, dated May 3, 2017, 12 Pages.

(Continued)

*Primary Examiner* — Stephen A Vu
(74) *Attorney, Agent, or Firm* — Brooks Kushman P.C.

(57) ABSTRACT

A manipulator arm includes at least one arm body for carrying a to-be-carried object. The arm body is provided with a suction plate for sucking the to-be-carried object, and the suction plate is provided with a plurality of vacuum suction holes. The plurality of vacuum suction holes are uniformly distributed in the entire suction plate.

15 Claims, 3 Drawing Sheets

(58) Field of Classification Search
CPC ...... B25J 16/06; B65G 47/91; H01L 21/6838;
B66C 1/0237; B66F 9/181
USPC .................................. 294/183, 188, 65, 213
See application file for complete search history.

(56) References Cited

U.S. PATENT DOCUMENTS

| | | | |
|---|---|---|---|
| 6,062,241 A * | 5/2000 | Tateyama | ............... B25B 11/007 |
| | | | 134/133 |
| 6,739,638 B1 | 5/2004 | Yazawa et al. | |
| 6,837,672 B1 * | 1/2005 | Tateyama | .......... H01L 21/67742 |
| | | | 294/188 |
| 7,338,102 B2 * | 3/2008 | Hayashi | ...................... B25J 7/00 |
| | | | 294/188 |
| 7,520,545 B2 * | 4/2009 | Kim | ...................... B65G 49/061 |
| | | | 294/213 |
| 8,585,115 B2 * | 11/2013 | Fairhurst | ........... H01L 21/67766 |
| | | | 294/213 |
| 8,899,650 B2 * | 12/2014 | Furuta | .................. B65G 47/918 |
| | | | 294/188 |
| 8,983,660 B1 * | 3/2015 | Hanfling | .............. B25J 11/0095 |
| | | | 700/254 |
| 2008/0129064 A1 * | 6/2008 | Harvey | ............... H01L 21/6838 |
| | | | 294/64.3 |
| 2009/0020229 A1 * | 1/2009 | Yoon | ................... H01L 21/6838 |
| | | | 156/350 |
| 2009/0084660 A1 * | 4/2009 | Kita | ..................... B25J 15/0052 |
| | | | 198/803.3 |
| 2009/0290960 A1 * | 11/2009 | Snodgrass | ............ B65G 49/061 |
| | | | 414/217 |
| 2009/0293663 A1 * | 12/2009 | Chang | .................... B25J 9/0012 |
| | | | 74/490.01 |
| 2011/0141448 A1 | 6/2011 | Aoki et al. | |
| 2014/0008929 A1 | 1/2014 | Cho | |
| 2014/0037413 A1 | 2/2014 | Takashima et al. | |
| 2016/0001449 A1 * | 1/2016 | Pergande | ............. B25J 15/0014 |
| | | | 361/234 |

FOREIGN PATENT DOCUMENTS

| | | | | |
|---|---|---|---|---|
| CN | 104179781 A | 12/2014 | | |
| CN | 205674219 U | 11/2016 | | |
| EP | 0429901 A1 | 6/1991 | | |
| EP | 2236252 A1 | 10/2010 | | |
| JP | 2009285823 A | * 12/2009 | ............ | B25J 9/0012 |
| KR | 20070033798 A | 3/2007 | | |
| KR | 20130138599 A | * 12/2013 | ......... | H01L 21/6838 |
| KR | 101385443 B1 | 4/2014 | | |
| WO | WO-2017192250 A1 | * 11/2017 | ............ | B25J 9/0012 |

OTHER PUBLICATIONS

Extended European Search Report for European Application No. 17736867.7, dated Dec. 19, 2020, 8 Pages.

* cited by examiner

MANIPULATOR ARM, MANIPULATOR AND CARRYING DEVICE

CROSS-REFERENCE TO RELATED APPLICATIONS

This application is the U.S. national phase of PCT Application No. PCT/CN2017/072533 filed on Jan. 10, 2017, which claims priority to Chinese Patent Application No. 201620437984.4 filed on May 13, 2016, the disclosures of which are incorporated in their entirety by reference herein.

TECHNICAL FIELD

The present disclosure relates to the field of manufacturing machinery technology, and in particularly to a manipulator arm, a manipulator and a carrying device.

BACKGROUND

Currently, in the productive process of Organic Light-Emitting Diodes (OLEDs), a manipulator for picking-and-placing a flexible substrate is provided with a plurality of vacuum suction pads. However, when the vacuum suction pads suck the flexible substrate, local deformation of the flexible substrate may be caused in picking and placing the flexible substrate, since the number of vacuum suction pads is limited and a large vacuum suction force is required. Moreover, since the vacuum suction pads on the manipulator provide suction forces at points, the whole flexible substrate deforms greatly.

SUMMARY

An object of the present disclosure is to provide a manipulator arm, a manipulator and a carrying device to pick and place a flexible substrate better during manufacturing of the flexible substrate, thus reducing deformation and increasing the product yield.

Technical solutions provided by the present disclosure are as follows.

The present disclosure provides a manipulator arm, which includes at least one arm body for carrying a to-be-carried object, wherein each of the at least one arm body is provided with a suction plate for sucking the to-be-carried object, and the suction plate is provided with a plurality of vacuum suction holes.

Furthermore, the suction plate is an anti-static plate made of an anti-static material.

Furthermore, a width of the suction plate on the arm body is identical to a width of the arm body.

Furthermore, a diameter of the vacuum suction hole is in the range of 0.1 mm~0.5 mm.

Furthermore, a distance between two adjacent vacuum suction holes is in the range of 5 mm~10 mm.

Furthermore, the plurality of vacuum suction holes is uniformly distributed in a matrix on the suction plate.

Furthermore, the arm body is a carbon fiber arm body made of a carbon fiber material.

Furthermore, the arm body further includes a vacuum cavity connected to the plurality of vacuum suction holes.

The present disclosure provides a manipulator, including the above-mentioned manipulator arm.

The present disclosure provides a carrying device, including the above-mentioned manipulator.

The present disclosure has the following beneficial effects.

According to the above solutions, the manipulator arm is provided with a flat suction plat to suck a to-be-carried object. When picking and placing a to-be-carried object, for example, a flexible substrate, since there are many vacuum suction holes on the suction plate, a relatively small vacuum pressure may be used to suck the flexible substrate such that the local deformation of the flexible substrate becomes small. In addition, since the flexible substrate is supported by the suction plate, the overall deformation of the flexible substrate also becomes small in comparison with the related art, thus reducing defects caused by the deformation and increasing the product yield of flexible substrates.

DETAILED DESCRIPTION

In order to make the objects, the technical solutions and the advantages of the embodiments of present disclosure more clear, the embodiments of the present disclosure will be described hereinafter in a clear and complete manner in conjunction with the drawings of the embodiments of the present disclosure. Certainly, the following embodiments are merely a part of, rather than all of, the embodiments of the present disclosure, and based on these embodiments of the present disclosure, a person skilled in the art may obtain other embodiments, which also fall within the protection scope of the present disclosure.

In order to solve the technical problem in the related art that the flexible substrate deforms when the manipulator picks and places the flexible substrate, the present disclosure provides a manipulator arm capable of picking-and-placing the flexible substrate better during manufacturing of the flexible substrate to reduce deformation and increase the product yield.

Figure 1:
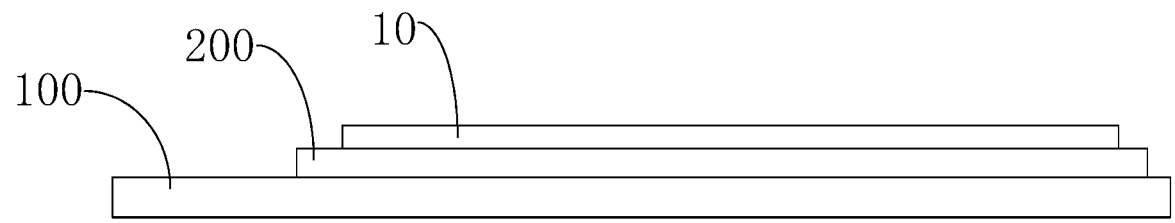
FIG. 1 is a side view showing a manipulator arm carrying a substrate provided by some embodiments of the present disclosure.
Figure 2:
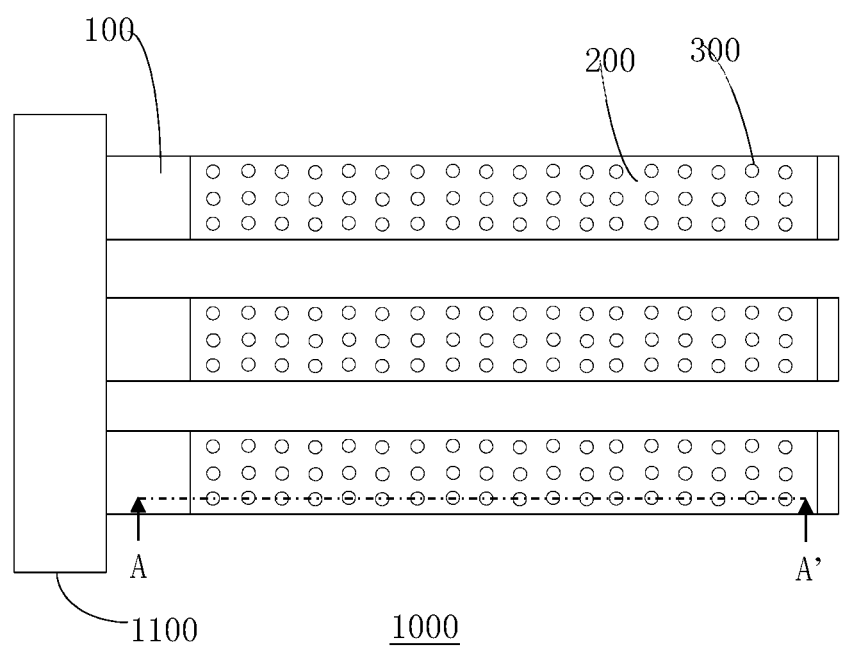
FIG. 2 is a front view showing a structure of a manipulator provided by some embodiments of the present disclosure.
Figure 3:
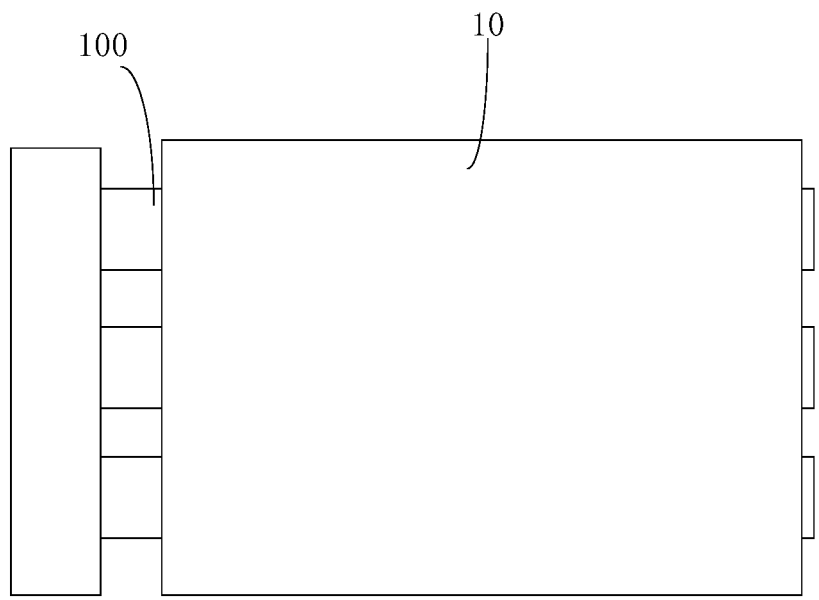
FIG. 3 is a front view showing a manipulator carrying a substrate provided by some embodiments of the present disclosure.

As shown in FIG. 1 to FIG. 3, a manipulator arm provided by the present disclosure includes at least one arm body 100 for carrying a to-be-carried object, wherein the arm body 100 is provided with a suction plate 200 for sucking the to-be-carried object, and the suction plate 200 is provided with a plurality of vacuum suction holes 300.

In above solutions, the manipulator arm is provided with the flat suction plate 200 to suck the to-be-carried object, and the to-be-carried object may be a substrate for display, a panel film material, etc. When using the manipulator arm provided by the present disclosure to pick and place a to-be-carried object, for example, a flexible substrate 10, since there are many vacuum suction holes 300 on the suction plate 200, a relatively small vacuum pressure may be used to suck the flexible substrate 10 such that the local deformation of the flexible substrate 10 will become small. In addition, since the flexible substrate 10 is supported by the suction plate 200, an overall deformation of the flexible substrate 10 will also become small in comparison with the related arts, thus reducing damages of a thin film transistor (TFT) caused by the deformation or defects generated by the cracking of a thin film encapsulation (TFE) film layer and increasing the product yield of the flexible substrate 10.

According to a manipulator arm provided by the present disclosure in some embodiments, optionally, the suction plate 200 is an anti-static plate made of an anti-static material, and the arm body 100 is a carbon fiber arm body 100 made of a carbon fiber material.

According to the above solutions, the suction plate 200 is made of an anti-static material, which provides an anti-static effect.

In addition, according to a manipulator arm provided by the present disclosure in some embodiments, optionally, a width of the suction plate 200 on the arm body 100 is identical to a width of the arm body 100.

According to the above solutions, the width of the suction plate 200 may be designed to be identical to the width of the corresponding arm body 100 to increase a contact area between the suction plate 200 and the flexible substrate 10.

It should be understood that, in practical applications, a size of the suction plate 200 may also be adjusted according to practical requirements.

In addition, according to a manipulator arm provided by the present disclosure in some embodiments, optionally, an aperture of the vacuum suction hole 300 is in the range of 0.1 mm~0.5 mm With the above solutions, since the size of the vacuum suction hole 300 is small, the deformation of the substrate 10 may further be reduced. Certainly, it should be understood that, the above-provided structure is merely an optional structure of the vacuum suction hole 300, and the specific size of the vacuum suction hole 300 in practical applications is not limited herein.

In addition, according to a manipulator arm provided by the present disclosure in some embodiments, optionally, a distance between two adjacent vacuum suction holes 300 distributed on the suction plate 200 is in the range of 5 mm~10 mm. In the above solutions, the number of the openings on the suction plate 200 is determined according to a distance between openings which is in the range of 5 m~10 mm, and an opening size is in the range of 0.1 mm~0.5 mm Certainly, it should be understood that, the above-provided structure is merely an optional structure of the vacuum suction hole 300, and the specific distance between the vacuum suction holes 300 in practical applications is not limited herein.

In addition, according to a manipulator arm provided by the present disclosure in some embodiments, optionally, as shown in FIG. 2, the plurality of vacuum suction holes 300 is distributed in a matrix on the suction plate 200. According to the above solutions, since the vacuum suction holes 300 on the suction plate 200 are uniformly distributed in a matrix, when picking and placing the flexible substrate 10, a relatively uniform suction force is applied to the flexible substrate 10. It should be understood that, the specific distribution of the vacuum suction holes 300 in practical applications is not limited herein.

Figure 4:
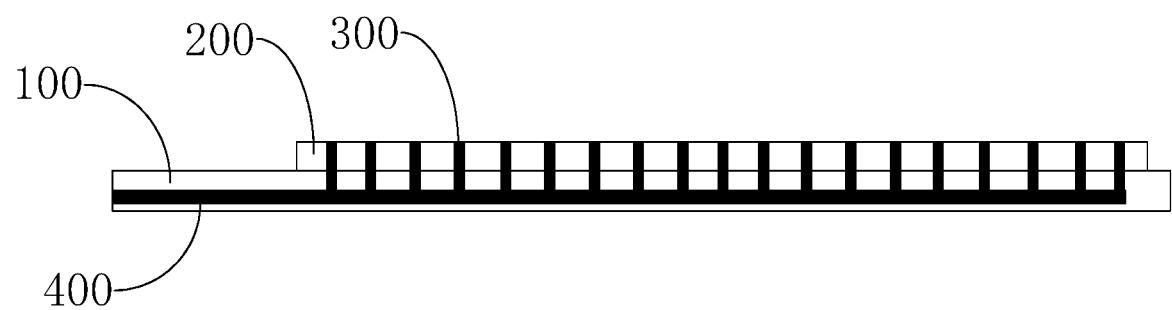
FIG. 4 is a schematic section view along line A-A' in FIG. 2 of the manipulator arm provided by some embodiments of the present disclosure.

In addition, according to a manipulator arm provided by the present disclosure in some embodiments, as shown in FIG. 4, the arm body 100 further includes a vacuum cavity 400 connected to the plurality of vacuum suction holes 300. By arranging a vacuum cavity 400 on the arm body 100 for vacuumizing, which is in communication with the plurality vacuum suction holes 300 using this vacuum cavity 400 to make the vacuum suction holes 300 suck and fix the substrate 10.

In addition, the present disclosure further provides in some embodiments a manipulator, including the above-mentioned manipulator arm. FIG. 2 shows a manipulator 1000 provided by the present disclosure in some embodiments, including a body 1100 and the above-mentioned manipulator arm. As shown in FIG. 2, the manipulator arm is arranged on the body 1100.

Figure 5:
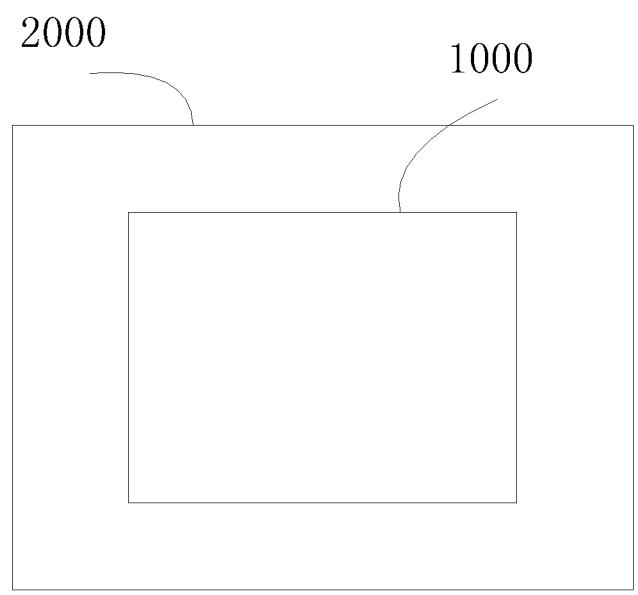
FIG. 5 is a schematic view showing a carrying device provided by some embodiments of the present disclosure.

In addition, the present disclosure further provides in some embodiments a carrying device including the above-mentioned manipulator. FIG. 5 shows a carrying device 2000 provided by the present disclosure in some embodiments, including the manipulator 1000.

The above are merely the optional embodiments of the present disclosure. It should be noted that, a person skilled in the art may make improvements and replacements without departing from the technical principle of the present disclosure, and these improvements and replacements shall also fall within the protection scope of the present disclosure.

What is claimed is:

1. A manipulator arm, comprising at least one arm body for carrying a to-be-carried object, wherein the arm body is provided with a suction plate for sucking the to-be-carried object, and the suction plate is provided with a plurality of vacuum suction holes;
   wherein the plurality of vacuum suction holes are uniformly distributed in the entire suction plate;
   the arm body further comprises a vacuum cavity connected to the plurality of vacuum suction holes; and
   the arm body further comprises a plurality of channels each in communication the vacuum cavity; the plurality of channels are communicated with the plurality of vacuum suction holes in a one-to-one manner.

2. The manipulator arm according to claim 1, wherein, the suction plate is an anti-static plate made of an anti-static material.

3. The manipulator arm according to claim 1, wherein, a width of the suction plate on the arm body is identical to a width of the arm body.

4. The manipulator arm according to claim 1, wherein, a diameter of the vacuum suction hole is in the range of 0.1 mm~0.5 mm.

5. The manipulator arm according to claim 4, wherein a distance between two adjacent vacuum suction holes is in the range of 5 mm~10 mm.

6. The manipulator arm according to claim 1, wherein, a distance between two adjacent vacuum suction holes is in the range of 5 mm~10 mm.

7. The manipulator arm according to claim 1, wherein, the plurality of vacuum suction holes is uniformly distributed in a matrix on the suction plate.

8. The manipulator arm according to claim 1, wherein, the arm body is a carbon fiber arm body made of a carbon fiber material.

9. A manipulator, comprising the manipulator arm according to claim 1.

10. The manipulator according to claim 9, wherein the manipulator arm is arranged on a body.

11. A carrying device, comprising the manipulator according to claim 9.

12. The manipulator arm according to claim 1, wherein the suction plate is stacked on the arm body.

13. The manipulator arm according to claim 1, wherein the arm body includes a first surface, and each of the plurality of channels extends from the first surface of the arm body inwardly to communicate with the vacuum cavity;

the suction plate includes a first surface and an opposite second surface; each of the plurality of vacuum suction holes extends from first surface of the suction plate to the second surface of the suction plate;

the first surface of the arm body is in contact with the first surface of the suction plate.

14. The manipulator arm according to claim 13, wherein all of the plurality of vacuum suction holes are communicated with each other only through the vacuum cavity and the plurality of channels in the arm body.

15. The manipulator arm according to claim 13, wherein each of the plurality of vacuum suction holes is communicated with the vacuum cavity through only one channel that corresponding to the each of the plurality of vacuum suction holes.

* * * * *